US012435048B2

(12) United States Patent
Schmidt et al.

(10) Patent No.: US 12,435,048 B2
(45) Date of Patent: Oct. 7, 2025

(54) METHOD FOR PREPARATION OF N-CARBOXYANHYDRIDES

(71) Applicant: LONZA LTD, Visp (CH)

(72) Inventors: Jens Schmidt, Visp (CH); Candid Stoffel, Visperterminen (CH); Elmar Millius, Visp (CH)

(73) Assignee: LONZA LTD, Visp (CH)

( * ) Notice: Subject to any disclaimer, the term of this patent is extended or adjusted under 35 U.S.C. 154(b) by 0 days.

(21) Appl. No.: 17/262,908

(22) PCT Filed: Sep. 26, 2019

(86) PCT No.: PCT/EP2019/075981
§ 371 (c)(1),
(2) Date: Jan. 25, 2021

(87) PCT Pub. No.: WO2020/064904
PCT Pub. Date: Apr. 2, 2020

(65) Prior Publication Data
US 2021/0253543 A1  Aug. 19, 2021

Related U.S. Application Data

(60) Provisional application No. 62/738,238, filed on Sep. 28, 2018.

(30) Foreign Application Priority Data

Sep. 28, 2018 (EP) .................................. 18197747
Mar. 5, 2019 (EP) .................................. 19160667
Apr. 11, 2019 (EP) .................................. 19168661

(51) Int. Cl.
*C07D 263/44* (2006.01)
(52) U.S. Cl.
CPC .................................. *C07D 263/44* (2013.01)
(58) Field of Classification Search
CPC .................................................. C07D 263/44
USPC .......................................................... 548/227
See application file for complete search history.

(56) References Cited

U.S. PATENT DOCUMENTS

| 2,600,596 | A |   | 6/1952  | Hilmer |            |
|-----------|---|---|---------|--------|------------|
| 3,637,727 | A | * | 1/1972  | Fujimoto | C07D 263/44 |
|           |   |   |         |        | 548/227    |
| 2002/0082431 | A1 | * | 6/2002 | Cornille | C07D 263/44 |
|           |   |   |         |        | 549/253    |
| 2002/0183551 | A1 |   | 12/2002 | Cornille et al. | |
| 2008/0274173 | A1 |   | 11/2008 | Sill et al. | |
| 2012/0123064 | A1 | * | 5/2012 | Chu | A61L 15/26 |
|           |   |   |         |        | 525/436    |
| 2013/0280306 | A1 |   | 10/2013 | Sill et al. | |
| 2019/0359579 | A1 | * | 11/2019 | Suka | B01D 9/0063 |

FOREIGN PATENT DOCUMENTS

| EP | 1201659 A1 | 2/2002 |
|----|------------|--------|
| EP | 1262480 A1 | 4/2002 |
| EP | 1288204 A1 | 2/2003 |
| WO | 2006/027788 A2 | 3/2006 |
| WO | WO-2006047703 A2 * | 5/2006 ........... C07D 263/44 |

OTHER PUBLICATIONS

Poche "Synthesis and Characterization of Linear and Star Branched Poly(7-stearyl-L-glutamate)" Aug. 1990, Dissertation, Louisiana State University.*
H.R. Kricheldorf, "a-Aminoacid-N-Carboxyanhydrides and Related Heterocycles", Springer-Verlag: New York, 1987, pp. 1-58.*
Tou "An N-Carboxyanhydride (NCA) Route to Aspartame" J. Org. Chem. 1985, 50, 4982-4984.*
Cherevin "N-Trifluoroacyl Lysine Derivatives in the Synthesis of L-Lysyl-L-glutamic Acid" Russian Journal of Organic Chemistry, 2007, vol. 43, No. 10, pp. 1427-1431.*
Kricheldorf, H.R "Synthesis and Characterization of NCAs" Chapter 1 in a-Aminoacid-N-Carboxy-Anhydrides and Related Heterocycle Springer-Verlag:Berlin, 1987, pp. 1-58.*
Cotarca "Bis(trichloromethyl)carbonate (BTC, Triphosgene): A Safer Alternative to Phosgene?" Org. Process Res. Dev. 2017, 21, 1439-1446, discussion on p. 1442.*
Ganiu "A decade review of triphosgene and its applications in organic reactions" Tetrahedron vol. 76, Issue 47, Nov. 20, 2020, 131553.*
Li "Optimization of Solvent Chasing in API Manufacturing Process: Constant Volume Distillation" Organic Process Research & Development 2009, 13, 73-77.*
International Search Report and Written Opinion dated Aug. 21, 2020 from International Application No. PCT/EP2019/075981 (Authorized Officer, Elke Stix-Malaun), 12 Pages.
Richard Gillard, Patentee's Submission in Opposition Proceedings filed Oct. 28, 2022 for corresponding European Patent No. 3810579, 113 pages.
Notice of Opposition to a European Patent dated Jun. 13, 2022 for European Patent No. 3810579 (Opponent, Regimbeau), 40 Pages.
Written submission in support of Opposition Brief against European Patent No. 3810579 filed by Opponent, Regimbeau, English Translation, 31 Pages.
Consolidated List in support of Opposition Brief against European Patent No. 3810579 filed by Opponent, Regimbeau, English Translation, 1 page.
Pei et al., "Size Controlled Synthesis of Ornithine-Based Polypeptides by Ring-Opening Polymerization of α-(amino acid) - N-Carboxyanhydrides", Journal of Polymer Science, Part A: Polymer Chemistry, 2016, vol. 54, pp. 311-315, Including English translation of Experiments reproducing the synthesis of Om(Z)-NCA.
Kowtoniuk et al., "Optimization of an α-(Amino acid) - N-Carboxyanhydrides Polymerization using the High Vacuum Technique: Examining the Effects of Monomer Concentration, Polymerization Kinetics, Polymer Molecular Weight, and Monomer Purity", Journal of Polymer Science, Part A: Polymer Chemistry, 2014, vol. 52, pp. 1385-1391.

(Continued)

Primary Examiner — David K O'Dell
(74) Attorney, Agent, or Firm — MH2 Technology Law Group, LLP

(57) ABSTRACT

The invention discloses a method for the preparation of N-carboxyanhydrides (NCAs) by reaction of amino acids with phosgene.

18 Claims, No Drawings

(56) References Cited

OTHER PUBLICATIONS

Palanisamy et al., "Upper Critical Solution Temperature Layer-by-Layer Films of Polyamino acid-Based Micelles with Rapid, On-Demand Release Capability", Chemistry of Materials, 2017, vol. 29, pp. 9084-9094.
Papadakis et al., "Solvent selection methodology for pharmaceutical processes: Solvent swap", Chemical Engineering Research and Design, 2016, vol. 115, Part B, pp. 443-461.
Richard Gillard, Patentee's further submission in opposition proceedings for corresponding European Patent No. 3810579, filed Aug. 11, 2023 by Elkington + Fife on behalf of Patentee (12 pages).
Eckert et al. "Triphosgene, a Crystalline Phosgene Substitute," Angew. Chem. Int. Ed. Engl., 1987, vol. 26, No. 9, pp. 894-895.
Wikipedia page on triphosgene, https://fr.wikipedia.org/wiki/Triphosg%C3%A8ne#:~:text=Le%20triphosg%C3%A8ne%20est%20un%20r%C3%A9active,un%20group%20amine%20en%20isocyanate, retrieved Aug. 8, 2023, 7 pages including English translation.
Anne Boutaric, Further submissions in opposition proceedings for corresponding European Patent No. 3810579 filed Aug. 1, 2023 by Regimbeau on behalf of Opponent (28 Pages, including English translation).
Richard Gillard, Reply to Opponent submitted in corresponding European Patent No. 3810579 on Sep. 19, 2023 by Elkington + Fife on behalf of Patentee (11 pages).
Kobylkova Fingerova (Formalities Officer), Decision in Opposition Proceedings dated Nov. 15, 2023 for corresponding European Patent No. 3810579, 38 pages.
Summon to attend oral proceedings pursuant to Rule 115(1) EPC and Preliminary opinion dated Mar. 1, 2023 for corresponding European Patent No. 3810579, 12 pages.
Written submission in support of Opposition Brief dated Jan. 30, 2023 against corresponding European Patent No. 3810579 filed by Opponent, Regimbeau, 11 Pages including English translation.
Tests According to Example 2 of WO2006/047703 dated Jan. 30, 2023 against corresponding European Patent No. 3810579 filed by Opponent, Regimbeau, 6 pages including English translation.

* cited by examiner

METHOD FOR PREPARATION OF N-CARBOXYANHYDRIDES

CROSS-REFERENCE TO RELATED APPLICATIONS

This application is a U.S. National Stage application of PCT/EP2019/075981 filed 26 Sep. 2019, which claims priority to U.S. Provisional Patent Application No. 62/738,238 filed 28 Sep. 2018, European Patent Application No. 18197747.1 filed 28 Sep. 2018, European Patent Application No. 19160667.2 filed 5 Mar. 2019, and European Patent Application No. 19168661.7 filed 11 Apr. 2019, the entire disclosures of which are hereby incorporated by reference in their entireties.

The invention discloses a method for the preparation of N-carboxyanhydrides (NCAs) by reaction of amino acids with phosgene.

BACKGROUND OF THE INVENTION

NCAs are industrially used in the preparation of peptides.

WO 2006/047703 A2 discloses a method for preparation of N-carboxyanhydride, wherein an amino acid is reacted in a solvent with phosgene, HCl formed a by-product is purged from the reaction mixture by passing a purge gas through the reaction mixture during the reaction. WO 2006/047703 A2 discloses a total of three examples, in all three examples the reaction mixture is concentrated after the reaction, by this concentration any solvent and excess phosgene are removed; in case of example 1 an oily residue is obtained, in case of Example 2, which illustrates the preparation of L-Glu-(OBzl)-OH, and Example 3 a residue crystallizes. The residue is dissolved in ethyl acetate, insoluble solids are removed by filtration. Then the product is crystallized by the addition of hexanes and isolated by filtration, then it is washed and dried.

US 2002/0082431 A1 discloses a method for preparation of NCA by reaction of the corresponding amino acid with phosgene, diphosgene and/or triphosgene in a solvent medium, characterized in that the reaction is a least partially carried out in the presence of an unsaturated organic compound which has one or more ethylenic double bonds, one of the carbon of at least one ethylenic double bond of which is completely substituted by substituents other than halogen atoms.

Example 2 discloses a yield of 68.8% in case of the alpha amino acid being Ala versus 79.0% in Example 3 of instant invention.

Example 4 discloses a yield of 91.3% and Example 5 discloses a yield of 92.6% in case of the alpha amino acid being Glu versus 93.5% in Example 3 of instant invention.

Example 3 discloses the conversion of Lys to the corresponding NCA, 2 eq alpha pinene are used.

There was a need for a method for preparation of NCA that does not require the presence of an unsaturated organic compound which has one or more ethylenic double bonds as required in US 2002/0082431 A1. The method should provide the NCAs in high yields, with high purity, with a low content of chloride.

A method for the preparation of NCAs was found that does not require the presence of an unsaturated organic compound which has one or more ethylenic double bonds as required in US 2002/0082431 A1, and which provides the NCAs in high yields, with high purity and with a low content of chloride.

Instant invention shows better yields compared to WO 2006/047703 A2 as summarized in Table 1:

TABLE 1

| | Acetate | Yield |
|---|---|---|
| Example 4 | butyl acetate | 93.5% |
| Example 5 | iso-propyl acetate | 91.5% |
| WO 2006/047703 A2 Example 2 | ethyl acetate | 89.2% |
| Comparative Example 1: (similar to Example 4) | ethyl acetate | 87.5% |
| Comparative Example 2: (similar to WO 2006/047703 A2 Example 2) | butyl acetate | 32.3% |
| Comparative Example 3: (similar to WO 2006/047703 A2 Example 2) | iso-propyl acetate | 42.6% |
| diglyme | 1-Methoxy-2-(2-methoxyethoxy)ethane | |
| triglyme | 1,2-Bis(2-methoxyethoxy)ethane | |
| eq | equivalent | |
| MTBE | methyl tert butyl ether | |
| NCA | N-carboxyanhydride | |
| TFA, Tfa | trifluoroacetyl, a protecting group | |
| THF | tetrahydrofuran | |

Abbreviations:
% percent are percent by weight (wt %, w/w), if not stated otherwise
Bzl benzyl, a protecting group
monoglyme 1,2-Dimethoxyethane

SUMMARY OF THE INVENTION

Subject of the invention is a method for the preparation of compound of formula (II),

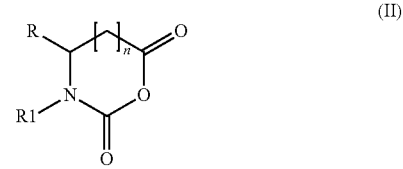

the method comprises a step STEP1,

STEP1 comprises a reaction REAC1, wherein compound of formula (I) is reacted with PHOS in a solvent SOLV1;

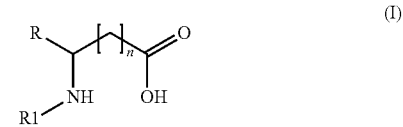

R is selected from the group consisting of —H, —CH₃, —CH₂—SH, —CH₂—COOH, —(CH₂)₂—COOH,

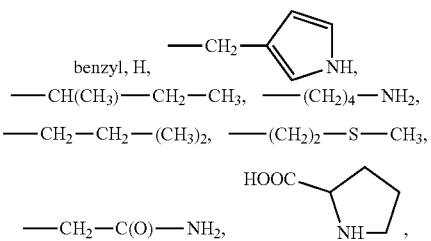

-continued

—(CH₂)₂—C(O)—NH₂,  —(CH₂)₃—NH—C(NH)—NH₂,

—CH₂—OH,  —CH(OH)—CH₃,  —CH(CH₃)₂,

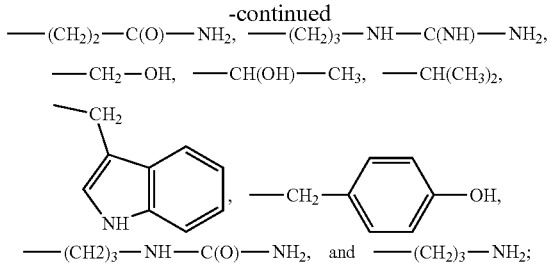

—(CH2)₃—NH—C(O)—NH₂, and  —(CH₂)₃—NH₂;

any functional residue of R, which is capable of reacting with phosgene, is protected by a suitable protecting group PG;

R1 is selected from the group consisting of H, C$_{1-4}$ alkyl and benzyl;

n is 0 or 1;

PHOS is selected from the group consisting of phosgene, diphosgene, triphosgene and mixtures thereof, SOLV1 is selected from the group consisting of THF, 2-Me-THF, dioxan, ethyl acetate, dichlormethane, monoglyme, diglyme, triglyme, cyclopentyl methyl ether, acetonitril, and mixtures thereof, in STEP2 part of SOLV1 is exchanged against a solvent SOLV2 by removal of from 35 to 87.5 wt % of SOLV1, the wt % being based on the weight of SOLV1;

SOLV2 can be added before, during or after removal of part of SOLV1;

SOLV2 is selected from the group consisting of hexyl formate, pentyl acetate, butyl propionate, propyl butyrate, ethyl valerat, methyl caproate, pentyl formate, butyl acetate, propyl propionate, ethyl butyrate, methyl valerate, butyl formate, propyl acetate, ethyl propionate, methyl butyrate, and mixtures thereof.

DETAILED DESCRIPTION OF THE INVENTION

In one embodiment, REAC1 is done in the absence of an unsaturated organic compound which has one or more ethylenic double bonds, the remainder of the molecule of which is inert with respect to compounds present in the medium and one of the carbons of at least one ethylenic double bond of which is completely substituted by substituents other than halogen atoms.

In another embodiment, REAC1 is done in the absence of an unsaturated organic compound which has one or more ethylenic double bonds, one of the carbon of at least one ethylenic double bond of which is completely substituted by substituents other than halogen atoms.

In another embodiment, REAC1 is done in the absence of an unsaturated organic compound which has one or more ethylenic double bonds, the remainder of the molecule of which is inert with respect to compounds present in the medium.

In another embodiment, REAC1 is done in the absence of an unsaturated organic compound which has one or more ethylenic double bonds.

Preferably, compound of formula (II) is compound of formula (II-L);

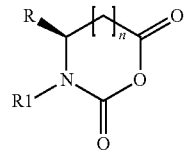
(II-L)

with R, R1 and n as defined herein, also with all their embodiments.

Preferably, compound of formula (I) is compound of formula (I-L);

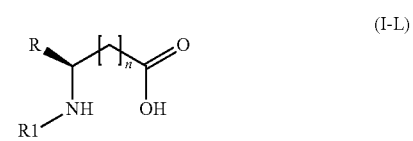
(I-L)

with R, R1 and n as defined herein, also with all their embodiments.

Preferably, compound of formula (I) is a naturally occurring amino acid, more preferably compound of formula (I) is selected from the group consisting of alpha Ala, beta Ala, Cys, Asp, Glu, Phe, Gly, His, Ile, Lys, Leu, Met, Asn, Pro, Gln, Arg, Ser, Thr, Val, Trp, Tyr, citrullin, and ornithine.

Preferably, R is selected from the group consisting of H,

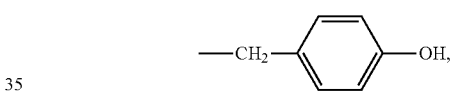

—(CH₂)₄—NH₂, —CH₃, and —(CH₂)₂—COOH.

more preferably, R is selected from the group consisting of

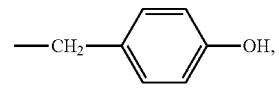

—(CH₂)₄—NH₂, —CH₃, and —(CH₂)₂—COOH.

Preferably, R1 is selected from the group consisting of H, methyl, ethyl and benzyl;

more preferably, R1 is H or methyl;

even more preferably R1 is H.

Preferably, when n is 1 then R1 is H or methyl;

more preferably, when n is 1 then R1 is H.

Preferably, n is 0.

PGs, which are suitable for protecting any functional residue of R against reaction with phosgene, are known to the skilled person, e.g. from Peter G. M. Wuts and Theodora W. Greene, "Greene's protective groups in organic synthesis", fourth edition, Wiley-Interscience, A. John Wiley & Sons, Inc., 2007, ISBN 978-0-471-69754-1, or from Norbert Sewald and Hans-Dieter Jakubke, "Peptides: Chemistry and biology", second, revised and updated edition, Wiley-VCH Verlag GmbH, 2009, ISBN 978-3-527-31867-4.

For each of the different functional residues of R there are preferred PGs depending on the desired mechanism of cleavage of a PG from any functional group of R after REAC, also this is known to the skilled person.

PG is preferably a protecting group commonly used for protecting any functional residue in the side chains of naturally occurring alpha amino acids.

The guanidine group of Arg can be protected with a PG such as nitro, urethane (acyl), arenesulfonyl and trityl type.

Other suitable PG is for example selected from the group consisting of Z, Z(OMe), Z(2-NO$_2$), Z(NO$_2$), Z(Cl), Z(3,5-OMe), Z(2-Br), Ddz, Nvoc, Pz, Tmz, Bic, Bpoc, Azoc, iNoc, Boc, Cyoc, Tcboc, Adoc, Adpoc, Iboc, Fmoc, Mio-Fmoc, Dio-Fmoc, Tsoc, Msc, Nsc, Bspoc, Bsmoc, Mspoc, Alloc, Teoc, Tipseoc, Pipoc, Poc, PTnm, Epoc, Dts, Tsc, For, Tfa, Tos, oNbs, pNbs, dNbs, Bts, Nps, Dde, ivDde, Nde, Trt, Trt(2-Cl), Bzl, (BZl)$_2$, Bzl(4-Me), Me, Et, Nbz, Mob, 2,4-Dmb, Pic, Tse, Pac, Pac(OMe), tBu, Cy, 1-Ada, 2-Ada. Pf, Fm, TMSE, PTMSE, Dcpm, All, Dmba, BCMACM, Hmb, Hnb, SiMB, nitro, Mbs, Mts, Mtr, Pme, Pbf, Ans, Btb, Npys, PTnm, Acm, Tmb, Dpm, Tacm, StBu, SMpys, Allocam, Xan, Dnp, Bom, Pdpm, Bum, Allom, Bzl, Deb, Zte, Mtm, Pen, Hoc, Mbh, 4,4'-dimethyldiphenylmethyl, 4,4'-dimethoxydiphenylmethyl, 4-methoxybenzyl, 2,4-dimethoxybenzyl, 2,4,6-trimethoxybenzyl, and diphenylmethyl;

the meaning of these abbreviations for PG can be found in Norbert Sewald and Hans-Dieter Jakubke, "Peptides: Chemistry and biology", second, revised and updated edition, Wiley-VCH Verlag GmbH, 2009, ISBN 978-3-527-31867-4, also which of these PGs are suited for protection of which functional residue of R can be found therein.

Preferably, compound of formula (I) is selected from the group consisting of Tyr, Lys, alpha Ala, beta Ala, N-methyl alanine, and Glu;

more preferably, compound of formula (I) is selected from the group consisting of Tyr, Lys, alpha Ala, N-methyl alanine, and Glu;

preferably, the functional residue of R is protected by a PG selected from the group consisting of Tfa or Bzl;

so compound of formula (I) in its respective protect form is preferably selected from the group consisting of Tyr, Lys(Tfa), alpha Ala, beta Ala, N-methyl alanine, and Glu(Bzl);

more preferably from the group consisting of Tyr, Lys (Tfa), alpha Ala, N-methyl alanine, and Glu(Bzl);

Preferably, PHOS is phosgene.

Preferably, the molar amount of PHOS in REAC is from 1 to 5 eq, more preferably of from 1.1 to 4 eq, even more preferably of from 1.2 to 3.5 eq, especially of from 1.3 to 3 eq, of the molar amount of compound of formula (I).

Preferably, SOLV1 is THF, 2-Me-THF, acetonitrile or a mixture thereof;

more preferably, SOLV1 is THF or 2-Me-THF;

even more preferably, SOLV1 is THF.

Preferably, the weight of SOLV1 is from 2 to 40 fold, more preferably from 3 to 30 fold, even more preferably from 4 to 25 fold, of the weight of compound of formula (I).

Preferably, REAC1 is done at a temperature TEMPREAC1, TEMPREAC1 is from 0 to 70° C., more preferably from 10 to 60° C., even more preferably of from 15 to 55° C.

Preferably, the reaction time TIMEREAC1 of REAC1 is from 10 min to 9 h, more preferably of from 20 min to 7 h, even more preferably of from 20 min to 6 h.

TIMEREAC1 can comprise a time TIMEMIX1, wherein PHOS is mixed with compound of formula (I) and a time TIMESTIRR1, wherein the mixture of PHOS and compound of formula (I) is stirred;

TIMEMIX1 is preferably from 10 min to 4 h, more preferably from 30 min to 3 h, even more preferably from 1 to 3 h;

TIMESTIRR1 is preferably from 10 min to 5 h, more preferably, from 20 min to 4 h, even more preferably from 20 min to 3 h.

The hexyl, pentyl, butyl and propyl residues in SOLV2 can be any of the possible isomers, such as n-, iso-, sec- and tert-isomer.

Preferably, SOLV2, is butyl acetate, isopropyl acetate or pentylacetate;

more preferably, SOLV2 is butyl acetate;

even more preferably, SOLV2 is n-butyl acetate.

Preferably, SOLV2 is added during or after removal of part of SOLV1.

Even more preferably, SOLV2 is added after removal of this part of SOLV1.

When part of SOLV1 is removed, then preferably from 40 to 85 wt %, more preferably from 45 to 85 wt % are removed, the wt % being based on the weight of SOLV1.

When SOLV2 is added only after said removal of part of SOLV1, then the volume of the reaction mixture after said removal of part of SOLV1 and before the addition of SOLV2 is preferably from 1 to 10 ml per g of compound of formula (I), more preferably from 2 to 6 ml per g of compound of formula (I).

Preferably, the weight of SOLV2 is from 2 to 15 fold, more preferably from 2 to 13 fold, even more preferably from 2 to 12 fold, especially from 3 to 11 fold, of the amount of compound of formula (I).

Preferably, the temperature TEMP2 during the exchange of SOLV1 against SOLV2 is from 10 to 100° C., more preferably from 20 to 75° C., even more preferably of from 30 to 60° C.

STEP2 can comprise a filtration FILT2 of the reaction mixture, the filtration can be done before or after the exchange of SOLV1 against SOLV2, preferably it is done after the exchange of SOLV1 against SOLV2.

Preferably, FILT2 is done with a filter having a pore size of from 0.1 to 10 micrometer, more preferably of from 0.2 to 5 micrometer, even more preferably of from 0.3 to 2 micrometer.

After FILT2 the filter can be washed with SOLV2.

Preferably, the weight of SOLV2, that is used to wash the filter after FILT2, is from 0.5 to 7.5 fold, more preferably from 0.75 to 5 fold, even more preferably from 1 to 3 fold, of the weight of compound of formula (I).

Preferably, the method comprises a further step STEP3, STEP3 is done after STEP2;

in STEP3 part of SOLV2 is removed.

Preferably, the volume of the reaction mixture after removal of part of SOLV2 is from 1.5 to 15 ml per g of compound of formula (I), more preferably from 1.5 to 10 ml per g of compound of formula (I), even more preferably from 2 to 8 ml per g of compound of formula (I).

Preferably, the method comprises a further step STEP4, STEP4 is done after STEP2 or after STEP3;

in STEP4 the mixture from STEP2 or from STEP3 respectively is mixed with a solvent SOLV4;

SOLV4 is selected from the group consisting of pentane, hexane, cyclohexane, methylcyclohexane, heptane, octane, toluene, xylene, diethylether, MTBE, any isomers thereof, and mixtures thereof;

preferably SOLV4 is heptane, any isomer thereof, toluene, or mixtures thereof, more preferably, SOLV4 is an isomeric mixture of heptane or toluene.

Preferably, SOLV4 is added to the mixture from STEP2 or from STEP3 respectively.

Preferably, the weight of SOLV4 is from 0.1 to 15 fold, more preferably from 0.2 to 10 fold, even more preferably from 0.2 to 5 fold, especially from 0.3 to 4 fold, of the weight of compound of formula (I).

Preferably, the temperature TEMP4 during the mixing of the mixture from STEP2 or from STEP3 respectively with SOLV4 is from 0 to 95° C., more preferably from 20 to 75° C., even more preferably of from 30 to 60° C., especially from 35 to 55° C.

Preferably, the method comprises the STEP3 and STEP4 is done after STEP3.

Preferably, the method comprises a further step STEP5, STEP5 is done after STEP4;
in STEP5 the mixture from STEP4 is cooled to a temperature TEMP5;
TEMP5 is from −20 to 20° C., preferably from −15 to 15° C., more preferably from −10 to 10° C., even more preferably from −5 to 5° C., especially from −2.5 to 2.5° C., more especially from −1 to 1° C.

Preferably, the time TIME5 for the cooling in STEP5 is from 0.5 to 10 h, more preferably from 1 to 5 h, even more preferably from 2 to 4 h.

Preferably, STEP5 comprises a stirring STIRR5 after the cooling.

Preferably, STIRR5 is done at TEMP5.

Preferably, the time of STIRR5 is from 0.1 to 48 h, more preferably from 0.25 to 48 h, even more preferably from 0.5 to 24 h, especially from 0.5 to 20 h, more especially from 0.5 to 18 h.

In one embodiment, the method comprises the steps STEP1 and STEP2;
in another embodiment, the method comprises the steps STEP1, STEP2 and STEP3;
in another embodiment, the method comprises the steps STEP1, STEP2 and STEP4;
in another embodiment, the method comprises the steps STEP1, STEP2, STEP3 and STEP4; in another embodiment, the method comprises the steps STEP1, STEP2, STEP4 and STEP5 in another embodiment, the method comprises the steps STEP1, STEP2, STEP3, STEP4 and STEP5.

After any of the steps STEP1, STEP2, STEP3, STEP4 or STEP5, compound of formula (II) can be isolated by standard methods known to the skilled person, such as distillation, centrifugation, filtration, washing and drying, preferably filtration, washing and drying. A washing, preferably after a filtration, can be done with SOLV4.

EXAMPLES

Materials

L-Tyrosine Sichuan Tongsheng Amino acid Co., Ltd, Deyang, SiChuan, China
L-Lys(Tfa)-OH Shanghai Science Biotechnology Co., Ltd, Jiading District, Shanghai, China
L-Alanine Fagron BV, Rotterdam, The Netherlands
L-Glu-(OBzl)-OH Sichuan Tongsheng Amino acid Co., Ltd, Deyang, SiChuan, China
heptane isomeric mixture of heptane, such as EXXSOL™ HEPTANE of Exxon Mobil Corporation.
butyl acetate the butyl acetate used in the examples was n-butyl acetate, if not otherwise stated.

Example 1

Under $N_2$ atmosphere, 20.0 g (0.110 mol, 1.00 eq) L-Tyrosine and 400 g THF were charged into a 500 mL reactor equipped with a reflux condenser with a cooler temperature of −15° C. and the mixture was heated to 45° C. 15.3 g (0.155 mol, 1.41 eq) phosgene were added over 120 min at 45° C. The suspension was stirred at 45° C. until all solids were dissolved, which was the case after approximately 30 min. The volume was reduced to 100 mL by distillation. 200 g of butyl acetate were added at 40 to 50° C. The reaction volume was reduced to 150 mL by distillation. The suspension, that had formed, was cooled to 0° C. within 3 h and stirred for 17 h at 0° C. The suspension was filtered under vacuum and the filter cake was washed with 25 mL of heptane. The solid was dried at 50° C. under vacuum to yield 21.8 g (95.9%) of the white product.
assay by $CO_2$ titration 98.0% w/w
chloride content by titration 426 mg/kg Example 2

Under $N_2$ atmosphere, 45.0 g (0.186 mol, 1.00 eq) L-Lys (TFA)-OH and 391 g THF were charged into a 500 mL reactor equipped with a reflux condenser with a cooler temperature of −15° C. and the mixture was heated to 20° C. 46.0 g (0.465 mol, 2.50 eq) phosgene were added over 120 min at 20° C. The suspension was heated to 30° C. within 30 min and stirred until all solids were dissolved, which was the case after approximately 2 h 20 min. The volume was reduced to 100 mL by distillation. 150 g of butyl acetate were added at 35 to 40° C. The solution was filtered over a 0.5 micrometer filter. The reactor and the filter were washed with 50 g of butyl acetate. The combined product solutions were reduced to 100 mL by distillation and 17 g heptane were added at 40 to 50° C. The suspension, that had formed, was cooled to 0° C. within 3 h and stirred for 1 h at 0° C. The suspension was filtered under vacuum and the filter cake was washed with 50 mL of heptane. The solid was dried at 50° C. under vacuum to yield 43.1 g (86.5%) of the white product.
assay by $CO_2$ titration 98.6% w/w
chloride content by titration 389 mg/kg Example 3

Under $N_2$ atmosphere, 20.0 g (0.224 mol, 1.00 eq) L-Alanine and 445 g THF were charged into a 500 mL reactor equipped with a reflux condenser with a cooler temperature of −15° C. and the mixture was heated to 50° C. 55.0 g (0.561 mol, 2.50 eq) phosgene were added over 120 min at 50° C. The suspension was stirred until all solids were dissolved, which was the case after approximately 2 h. The volume was reduced to 100 mL by distillation. 214 g of butyl acetate were added at 35 to 40° C. The solution was filtered over a 1 micrometer filter. The reactor and the filter were washed with 50 g of butyl acetate. The combined product solutions were reduced to 100 mL by distillation and 75 g heptane were added at 40 to 50° C. The suspension, that had formed, was cooled to 0° C. within 3 h and stirred for 1 h at 0° C. The suspension was filtered under vacuum and the filter cake was washed with 25 mL of heptane. The solid was dried at 50° C. under vacuum to yield 20.4 g (79.0%) of the white product.
assay by $CO_2$ titration 97.7% w/w
chloride content by titration 620 mg/kg

Example 4

Under N₂ atmosphere, 45.0 g (0.189 mol, 1.00 eq) L-Glu-(OBzl)-OH and 258 g THF were charged into a 500 mL reactor equipped with a reflux condenser with a cooler temperature of −15° C.) and the mixture heated to 50° C. 28.0 g (0.283 mol, 1.50 eq) phosgene were added over 120 min at 50° C. The suspension was stirred until all solids were dissolved, which was the case after approximately 1 h. The volume was reduced to 150 mL by distillation. 175 g of butyl acetate were added at 35 to 40° C. The solution was filtered over a 1 micrometer filter. The reactor and the filter were washed with 50 g of butyl acetate. The combined product solutions were reduced to 200 mL by distillation and 150 g heptane were added at 40 to 50° C. The suspension, that had formed, was cooled to 0° C. within 3 h and stirred for 1 h at 0° C. The suspension was filtered under vacuum and the filter cake was washed with 50 mL of heptane. The solid was dried at 50° C. under vacuum to yield 46.5 g (93.5%) of the white product.

assay by $CO_2$ titration 98.9% w/w
chloride content by titration 262 mg/kg

Example 5

Example 4 was repeated with the difference, that iso-propyl acetate was added instead of butyl acetate.
Yield: 91.5%.

Comparative Example 1

Example 4 was repeated with the difference, that ethyl acetate was added instead of butyl acetate.
Yield: 87.5%, which is lower than the yields of over 90% of Examples 4 (butyl acetate) and 5 (iso-propyl acetate) and which is also lower than the yield of 89.2% of Example 2 of WO 2006/047703 A2.

Comparative Example 2

Example 2 of WO 2006/047703 A2 was repeated with the difference, that butyl acetate was used instead of ethyl acetate.
Yield: 32.3%, which is considerably lower than the yields of over 90% of Examples 4 (butyl acetate) and 5 (iso-propyl acetate).

Comparative Example 3

Example 2 of WO 2006/047703 A2 was repeated with the difference, that iso-propyl acetate was used instead of ethyl acetate.
Yield: 42.6%, which is considerably lower than the yields of over 90% of Examples 4 (butyl acetate) and 5 (iso-propyl acetate).

Examples 6 and 7

Example 3 was repeated with the differences given in Table 2:

| Example | Deviation from Example 3 | Yield [%] | Assay [wt %] | Chloride [mg/kg] |
|---|---|---|---|---|
| 6 | N-Methyl Alanine instead of L-Alanine | 77.6 | 98.7 | 505 |
| 7 | Toluene instead of heptane | 70.1 | 98.5 | 179 |

The invention claimed is:
1. A method for the preparation of compound of formula (II),

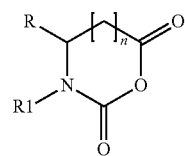

the method comprises a step STEP1 a step STEP2 and a STEP 3,
STEP2 is done after STEP1;
STEP3 is done immediately after STEP2;
STEP1 comprises a reaction REAC1, wherein compound of formula (I) is reacted with PHOS in a solvent SOLV1;

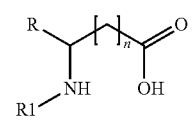

R is selected from the group consisting of —H, —CH₃, —CH₂—SH, —CH₂—COOH, —(CH₂)₂—COOH, benzyl, H,

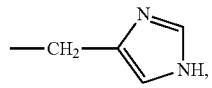

—CH(CH₃)—CH₂—CH₃, —(CH₂)₄—NH₂, —CH₂—CH₂—(CH₃)₂, —(CH₂)₂—S—CH₃, —CH₂—C(O)—NH₂, —(CH₂)₂—C(O)—NH₂,
(CH₂)₃—NH—C(NH)—NH₂, —CH₂—OH, —CH(OH)—CH₃, —CH(CH₃)₂,

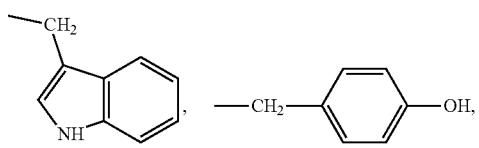

(CH₂)₃—NH—C(O)—NH₂, and —(CH₂)₃—NH₂;
any functional residue of R, which is capable of reacting with phosgene, is protected by a suitable protecting group PG;
R1 is selected from the group consisting of H, $C_{1-4}$ alkyl and benzyl;
n is 0 or 1;
R and R1 optionally form a pyrrolidine ring when n is 0;
PHOS is phosgene;
SOLV1 is selected from the group consisting of THF, 2-Me-THF, dioxan, ethyl acetate, dichlormethane, monoglyme, diglyme, triglyme, cyclopentyl methyl ether, acetonitril, and mixtures thereof;
in STEP2 part of SOLV1 is exchanged against a solvent SOLV2 by removal of an amount of SOLV1 consisting of from 35 to 87.5 wt % of SOLV1 by distillation, the wt % being based on the weight of SOLV1, wherein in STEP2

SOLV2 can be added before, during or after removal of the amount of SOLV1 consisting of from 35 to 87.5 wt % of SOLV1;
SOLV2 is selected from the group consisting of
hexyl formate, pentyl acetate, butyl propionate, propyl butyrate, ethyl valerat, methyl caproate,
pentyl formate, butyl acetate, propyl propionate, ethyl butyrate, methyl valerate,
butyl formate, propyl acetate, ethyl propionate, methyl butyrate, and mixtures thereof;
and
in STEP3 part of SOLV2 is removed by distillation.

2. Method according to claim 1, wherein
compound of formula (I) is a naturally occurring amino acid.

3. Method according to claim 1, wherein
compound of formula (I) is selected from the group consisting of alpha Ala, beta Ala, Cys, Asp, Glu, Phe, Gly, His, Ile, Lys, Leu, Met, Asn, Pro, Gln, Arg, Ser, Thr, Val, Trp, Tyr, citrullin, and ornithine.

4. Method according to claim 1, wherein
R is selected from the group consisting of H,

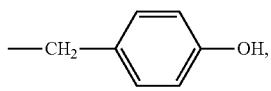

—(CH$_2$)$_4$—NH$_2$, —CH$_3$, and —(CH$_2$)$_2$—COOH.

5. Method according to claim 4, wherein
the functional residue of R is protected by a PG selected from the group consisting of Tfa or Bzl.

6. Method according to claim 1, wherein
R1 is selected from the group consisting of H, methyl, ethyl and benzyl.

7. Method according to claim 1, wherein
when n is 1 then R1 is H or methyl.

8. Method according to claim 1, wherein
n is 0.

9. Method according to claim 1, wherein
SOLV1 is THF, 2-Me-THF, acetonitrile or a mixture thereof.

10. Method according to claim 1, wherein
SOLV2, is butyl acetate, isopropyl acetate or pentylacetate.

11. Method according to claim 1, wherein
the method comprises a further step STEP4,
STEP4 is done after STEP3;
in STEP4 the mixture from STEP3 respectively is mixed with a solvent SOLV4;
SOLV4 is selected from the group consisting of pentane, hexane, cyclohexane, methylcyclohexane, heptane, octane, toluene, xylene, diethylether, MTBE, any isomers thereof, and mixtures thereof.

12. Method according to claim 11, wherein
SOLV4 is heptane, any isomer thereof, toluene, or mixtures thereof.

13. Method according to claim 11, wherein
the method comprises a further step STEP5,
STEP5 is done after STEP4;
in STEP5 the mixture from STEP4 is cooled to a temperature TEMP5;
TEMP5 is from −20 to 20° C.

14. Method according to claim 1, wherein SOLV2 is added after removal of the amount of SOLV1 consisting of from 35 to 87.5 wt % of SOLV1.

15. Method according to claim 14, wherein SOLV1 is THF, 2-Me-THF, acetonitrile or a mixture thereof.

16. Method according to claim 15, wherein SOLV2, is butyl acetate, isopropyl acetate or pentylacetate.

17. Method according to claim 1, wherein SOLV2 is added before or during removal of the amount of SOLV1 consisting of from 35 to 87.5 wt % of SOLV1.

18. A method for the preparation of compound of formula (II),

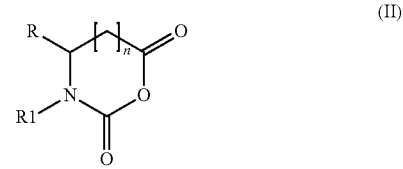

the method comprises a step STEP1 a step STEP2 and a STEP4,
STEP2 is done after STEP1;
STEP4 is done immediately after STEP2;
STEP1 comprises a reaction REAC1, wherein compound of formula (I) is reacted with PHOS in a solvent SOLV1;

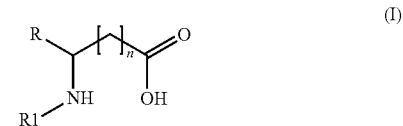

R is selected from the group consisting of —H, —CH$_3$, —CH$_2$—SH, —CH$_2$—COOH, —(CH$_2$)$_2$—COOH, benzyl, H,

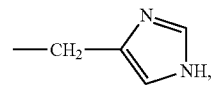

—CH(CH$_3$)—CH$_2$—CH$_3$, —(CH$_2$)$_4$—NH$_2$, —CH$_2$—CH$_2$—(CH$_3$)$_2$, —(CH$_2$)$_2$—S—CH$_3$, —CH$_2$—C(O)—NH$_2$, —(CH$_2$)$_2$—C(O)—NH$_2$, —(CH$_2$)$_3$—NH—C(NH)—NH$_2$, —CH$_2$—OH, —CH(OH)—CH$_3$, —CH(CH$_3$)$_2$,

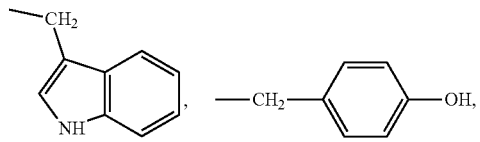

(CH$_2$)$_3$—NH—C(O)—NH$_2$, and —(CH$_2$)$_3$—NH$_2$;
any functional residue of R, which is capable of reacting with phosgene, is protected by a suitable protecting group PG;
R1 is selected from the group consisting of H, C$_{1-4}$ alkyl and benzyl;
n is 0 or 1;
R and R1 optionally form a pyrrolidine ring when n is 0;
PHOS is phosgene;

SOLV1 is selected from the group consisting of THF, 2-Me-THF, dioxan, ethyl acetate, dichlormethane, monoglyme, diglyme, triglyme, cyclopentyl methyl ether, acetonitril, and mixtures thereof;

in STEP2 part of SOLV1 is exchanged against a solvent SOLV2 by removal of an amount of SOLV1 consisting of from 35 to 87.5 wt % of SOLV1 by distillation, the wt % being based on the weight of SOLV1, wherein in STEP2

SOLV2 can be added before, during or after removal of the amount of SOLV1 consisting of from 35 to 87.5 wt % of SOLV1;

SOLV2 is selected from the group consisting of
  hexyl formate, pentyl acetate, butyl propionate, propyl butyrate, ethyl valerat, methyl caproate,
  pentyl formate, butyl acetate, propyl propionate, ethyl butyrate, methyl valerate,
  butyl formate, propyl acetate, ethyl propionate, methyl butyrate, and mixtures thereof; and in STEP4 the mixture from STEP2 is mixed with a solvent SOLV4;

SOLV4 is selected from the group consisting of pentane, hexane, cyclohexane, methylcyclohexane, heptane, octane, toluene, xylene, diethylether, MTBE, any isomers thereof, and mixtures thereof.

\* \* \* \* \*

UNITED STATES PATENT AND TRADEMARK OFFICE
CERTIFICATE OF CORRECTION

PATENT NO. : 12,435,048 B2  
APPLICATION NO. : 17/262908  
DATED : October 7, 2025  
INVENTOR(S) : Jens Schmidt et al.

Page 1 of 1

It is certified that error appears in the above-identified patent and that said Letters Patent is hereby corrected as shown below:

In the Claims

Column 11, Line 42, Claim 9: "THE" should be -- THF --.

Signed and Sealed this  
Second Day of December, 2025

John A. Squires  
*Director of the United States Patent and Trademark Office*